Feb. 21, 1933.  D. KELLY  1,898,451
FISHING REEL
Filed Nov. 18, 1930
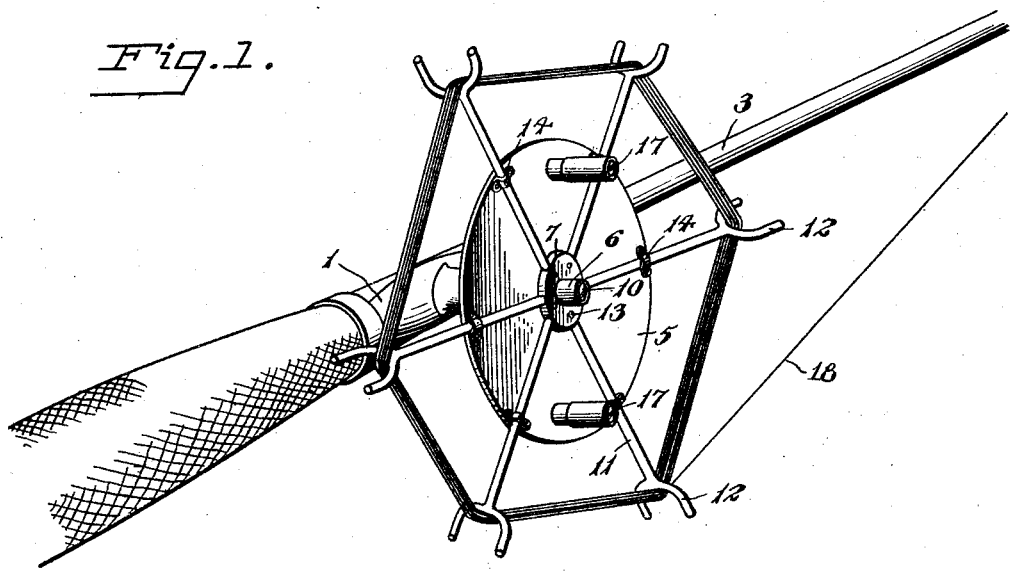
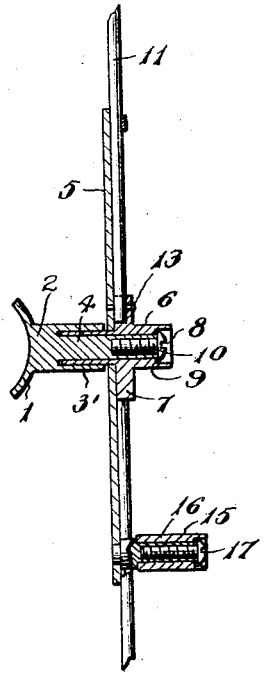
Inventor
Dennis Kelly
By Lacey & Lacey, Attorneys Patented Feb. 21, 1933

1,898,451

UNITED STATES PATENT OFFICE

DENNIS KELLY, OF MARSHALL, MICHIGAN, ASSIGNOR TO RUSSEL SEBRING, OF MARSHALL, MICHIGAN

FISHING REEL

Application filed November 18, 1930. Serial No. 496,471.

This invention relates to an improved fishing reel and seeks, among other objects, to provide a device of this character which will permit rapid winding of a fishing line connected therewith.

Another object of the invention is to provide a fishing reel of such construction that its speed of rotation may be readily controlled for preventing too rapid unwinding and consequent backlash.

A further object of the invention is to provide a fishing reel which will be efficient in use and which may be employed in connection with any type of fishing rod.

And the invention seeks, as a still further object, to provide a device of this character employing telescoping sleeves which will readily permit free rotation of the hub on the tubular shank employed, but which will prevent wobbling of the hub.

Other and incidental objects of the invention not particularly mentioned in the foregoing will appear during the course of the following description.

The invention is illustrated in the accompanying drawing, wherein,

Figure 1 is a perspective view of the device in position on a fishing rod, and

Fig. 2 is a fragmentary vertical sectional view of the device.

Referring now more particularly to the drawing, the numeral 1 indicates an oblong arcuate base plate and formed on said base plate is an upstanding cylindrical shank 2. The base plate is adapted to be secured to a fishing rod, such as is indicated by the numeral 3, in any approved manner. As best seen in Fig. 2 of the drawing, the shank is recessed at its free end portion to define a sleeve 3' and an axially disposed spindle 4 which projects past the free end of the sleeve. Associated with the tubular shank 2 and sleeve 3' is a preferably sheet metal circular hub plate 5, and mounted on said hub plate axially thereof is a hub 6 having a flange 7 riveted or otherwise secured to said plate. As best seen in Fig. 2 of the drawing, the hub is reduced and projected rearwardly through the plate 5 and forms a bearing which is rotatably received in the recess defined between the sleeve 3 and the spindle 4, the bearing, of course, telescoping into the sleeve 3'. The outer end of the hub is recessed to provide a socket 8 and a shoulder 9, the outer end of the spindle 4 normally terminating flush with the shoulder 9. Rotatably connecting the hub and plate with the sleeve 3 and shank 2 is a screw 10 which engages in said socket 8 and abuts the shoulder 9 for limiting the hub against outward movement with respect to the shank and sleeve.

Carried on the hub plate 5 and extending radially from the hub flange 7 is a plurality of arms 11, six being shown, which arms are bifurcated at their free end portions to provide substantially U-shaped line retainers 12. Extending through the hub flange 7 and plate 5 are rivets 13 which serve to anchor the inner end portions of the arm 11 to the hub and also serve to anchor said hub to said plate. Riveted or otherwise secured to the plate 5 at the circumferential margin thereof and fitting about the arms 11 are bowed straps 14 which serve to anchor the arms at the circumference of the plate 5 and tend to prevent bending of the arms. Riveted or otherwise secured to the plate 5 and disposed near the circumference thereof are preferably two diametrically disposed studs 15 and rotatable on said studs are cylindrical handles 16, which handles are removably secured on said studs by screws 17.

As shown in Fig. 1 of the drawing, the device is secured to a fishing rod in any appropriate manner, when a fishing line, such as is indicated by the numeral 18, is attached to one of the arms 11, when one of the handles 16 may be grasped for winding the line about the arms and the retainers. It will be noted that inasmuch as the arms are relatively long, a large circumference will be provided for the device so that a relatively great amount of line will be wound upon the device at a single rotation thereof. Thus, quick winding of the fishing line will be permitted. When it is desired to unwind, or unreel, the device, such unreeling may be controlled by placing a thumb or finger against the inner surface of the plate 5 and bearing against said plate as much as is necessary to brake, or slow down, the rotation of the plate to suit the outward discharge of the line, thereby preventing backlash, which would otherwise be caused by too rapid rotation of the device. Attention is directed to the fact that inasmuch as the device is located immediately forwardly of the handle of the fishing rod, ready engagement of a thumb upon the plate 5 will be permitted so that the braking operation may be effected with no discomfort to the fisherman.

Attention is directed to the fact that the line retainers 11 will be formed preferably of a light-weight metal so that the rotation of the hub assembly may be controlled with a minimum amount of frictional engagement by the thumb.

Having thus described the invention, I claim:

A fishing reel including a base plate having a shank, a circular hub plate, a hub connected therewith and telescoping into the shank, line retainers carried by the hub plate and hub and extending radially therefrom, the inner end portions of said line retainers being anchored within the hub, and bowed straps carried by the circular hub plate and engaging the line retainers at points substantially intermediate their ends whereby said straps and circular plate will cooperate with the hub and provide reinforcement for said line retainers throughout substantially half their length.

In testimony whereof I affix my signature.

DENNIS KELLY. [L. S.]